3,096,175
PHOTOELASTIMETRIC APPARATUS FOR STRESS ANALYSIS

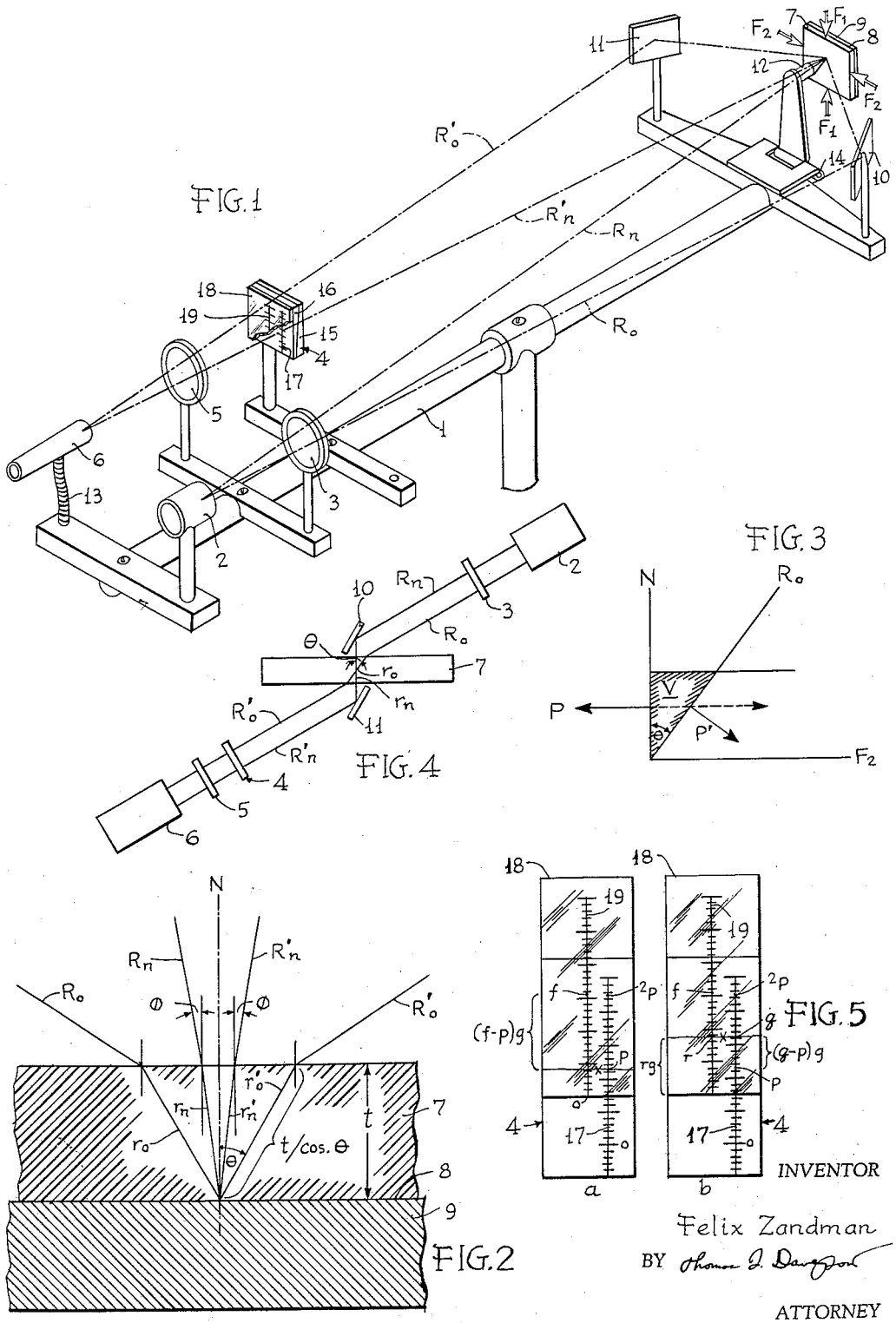

Felix Zandman, Paris, France, assignor to The Budd Company, Philadelphia, Pa., a corporation of Pennsylvania
Filed Jan. 18, 1960, Ser. No. 3,049
Claims priority, application France Mar. 21, 1959
1 Claim. (Cl. 88—14)

This invention pertains to photoelastimetric apparatus for the investigation of unknown biaxial stresses and more particularly to such apparatus adapted for direct determination of the magnitude of such stresses.

Photoelastimetric stress investigations are predicated upon the phenomenon of forced double refraction or birefringence which occurs in certain transparent materials under the action of loading forces. While transparent materials generally exhibit birefringence, preferred materials include glycerin phthallic anhydride sold under the trademark Bakelite, a solid colloidal mixture of nitrocellulose in camphor sold under the trademark Celluloid and borosilicated glass. Test pieces may be formed as models from sheets of these materials or may constitute portions of such sheets attached to prototype workpieces. In either case the birefringent test piece is subjected to the loading forces which produce the stress patterns to be investigated within the test piece.

Within a region of a birefringent test piece, incident plane polarized light rays are resolved into two sets of component rays respectively plane polarized parallel with the minimum and maximum stress directions produced by the loading forces. Each incident ray may be considered as resolved into an ordinary, or O-ray, and an extraordinary, or E-ray. The indices of refraction $n_O$ and $n_E$ for the ordinary and extraordinary rays differ and this difference is proportional to the principal stress difference according to:

$$(n_O - n_E) = k'(s_1 - s_2) \quad \text{(I)}$$

where $k'$ is a proportionality constant and $s_1$ and $s_2$ are the stress magnitudes normal to the path of the refracted rays through the birefringent material.

Since the E and O rays traverse the material at velocities inversely proportional to their respective indices of refraction, there is the equivalent of two different optical path lengths for any given physical path length through the material. The difference $d$ between the optical path lengths is also proportional, directly, to the physical path length D and may be expressed as:

$$d = (n_O - n_E)D = k(s_1 - s_2)D \quad \text{(II)}$$

The equivalent path difference is evidenced by a retardation of one of the component rays relative to the other (depending upon whether $n_E$ is greater or less than $n_O$) and a concomitant phase difference between the vibrations of the emergent E and O rays.

When the emergent rays are directed through an analyzer (a plane polarizer comprising a Nicol prism or a dichoric sheet of oriented herapathite crystals) the emergent E and O components vibrate in the same plane of polarization and interference fringe patterns are produced. The fringe patterns result from the reinforcement and destructive interference of the emergent light. The birefringent material being viewed through the analyzer, the fringe patterns appear superimposed upon the physical features of the test piece under study.

The fringe patterns comprise isoclinic and isochromatic fringes. The isochromatic, interference, fringes are the loci of points where the principal stress difference produces, according to Equation II above, a phase difference of:

$$d = (NL + AL) \quad \text{(III)}$$

where N, the fringe order, is an integer or zero; L is the wave length of a color of the incident light; and A is a constant, equal to ½ or to 0 depending upon the relative orientation of the plane of polarization of the analyzer as either parallel with or perpendicular to the plane of polarization of the incident light. At points in the region investigated, the relative retardation results in extinction by interference and subtraction of those wave lengths of the incident light for which Equation III is satisfied. With monochromatic incident light the interference patterns comprise alternate bright and dark areas; with polychromatic light the fringe colors are complementary to the extinguished wave lengths. Therefore, the principal stress difference at a point is known when the fringe order and color at that point are known for a given orientation of the system.

Isoclinic, light intensity, fringes indicate the directions of the principal stresses. These fringes are the loci of points where the plane of polarization of either the E rays or the O rays, and hence one of the principal stress directions, is at right angles to the plane of polarization of the incident light. The isoclinic fringes are dark lines when the plane of polarization of the analyzer is perpendicular to that of the source. Principal stress directions are, therefore, readily obtainable.

In order to obtain the magnitudes of the principal stresses per se, however, it has been necessary in the past to make at least two separate investigations with the incident light in each case directed differently relative to the plane of the birefringent sheet and to solve, simultaneously, two equations relating the principal stress magnitudes. During the first investigation, the incident light is usually directed at right angles to the surface of the birefringent sheet to obtain information according to:

$$d_n = (NL + AL) = k(s_1 - s_2)D_n \quad \text{(IV)}$$

The subscript $n$ indicating normal incidence, $D_n$ is equal to the thickness ($t$) of the sheet for observations by transmisison and equal to twice the thickness of the sheet ($2t$) for observations by reflection from a mirror surface on the side of the sheet opposite to the source and analyzer. The normal isoclinic fringes are observed to obtain the directions of the principal stresses parallel with the surface of the sheet and normal to the path of refracted light in the test piece. Thereafter, observations are made with the path of the refracted light directed obliquely with respect to one of the normal incidence principal stress directions, the $s_2$ direction for example, and normally to the other, the $s_1$ direction. By the oblique incidence observation information is obtained according to:

$$d_o = (NL + AL) = k(s_1 - s_2')D \quad \text{(V)}$$

where $s_2'$ is a secondary principal stress normal to the path of the refracted oblique incident light. The subscript $o$ indicates oblique incidence and $D_o$ is related to $D_n$ by:

$$D_o = D_n \sec \theta \quad \text{VI}$$

where $\theta$ is the oblique angle of incidence. The relationship between $s_2'$ and $s_2$ is given according to the general theories of stress analysis as:

$$s_2' = s_2 \cos^2 \theta \quad \text{(VII)}$$

It follows directly that Equation V may be rewritten as $$d_o = (NL + AL) = k(s_1 - s_2 \cos^2\theta)D_n \sec \theta \quad \text{(VIII)}$$

Equations IV and VIII, finally, are solved simultaneously for the magnitudes of the principal stresses $s_1$ and $s_2$ perpendicular to the normal incidence light path and hence parallel with the plane of the loading forces applied to the test piece.

The employment of repeated determinations of optical phenomena related with a single region necessarily produces errors due to the difficulty in orienting separate optical systems and in correlating their presentations. It is time consuming and expensive to duplicate these observations and the algebraic solutions are a further source of difficulty.

An object of this invention is to provide apparatus whereby normal and oblique incidence fringe patterns are obtainable without interchange of any apparatus components or component positions.

A further object is to produce apparatus adapted for the determination of stresses produced within birefringent test pieces whereby principal stress magnitudes are directly proportional to a direct reading scale position.

The photoelastimetric method of this invention comprises the step of directing a first portion of a beam of light from a plane polarized light source through a region in a test piece of birefringent material in a direction substantially normal to first principal stress directions therein and through an analyzer, and the simultaneously step of directing a second portion of the beam through the region in a direction perpendicular to one of the first principal stress directions and at an oblique angle with the other first principal stress direction and through the analyzer whereby normal and oblique incidence fringe patterns are simultaneously produced.

Photoelastimetric apparatus of the type comprising a source of polarized light, an analyzer, and normal incidence light directing devices oriented with respect to the source and the analyzer to direct a portion of the light from the source through a region in a birefringent material test piece along a path substantially normal to the principal stress directions within the region and through the analyzer in series, to produce a normal incidence fringe pattern directly related to the stresses within the region when the source and the analyzer are in a predetermined orientation with respect to the region, is characterized according to this invention, in that the apparatus includes oblique incidence light directing devices oriented with respect to the source and the analyzer to direct another portion of the light through the region along a path substantially perpendicular to one of the principal stresses and at a substantially oblique angle with the other of the principal stresses and through the analyzer, in series, to produce simultaneously with the production of the normal incidence fringe pattern an oblique incidence fringe pattern directly related to the stresses within the region.

The invention is further characterized in that a birefringent compensator is oriented in one of the paths of the normal and oblique incidence light portions and is provided with a scale calibrated to indicate directly the magnitude of a principal stress at a point in the test piece according to the relative positions of similar isochromatic fringes in the normal and oblique incidence fringe patterns associated with that point.

A better understanding, however, of this invention, may be had upon consideration of the following detailed explanation thereof taken in conjunction with the accompanying drawing, wherein:

FIG. 1 is an over-all view of an apparatus characterized according to this invention;

FIG. 2 is a magnified diagrammatic illustration of normal and oblique incidence light paths through a birefringent test piece;

FIG. 3 is a diagram useful in explaining the relationship between unit stresses parallel with and at an oblique angle with the loading forces on a test piece;

FIG. 4 is a schematic illustration of an alternative embodiment of the photoelastimetric apparatus of this invention; and FIG. 5 illustrates the application of birefringent compensators for the direct reading presentation of the magnitude of a principal stress in a test piece.

With particular reference to FIGURE 1, a photoelastimetric apparatus is shown of the type including a mount 1, a source of plane polarized light including a lamp 2 and a plane polarizer 3, a compensator 4, an analyzer 5 and a viewing device 6, all oriented with respect to a test piece 7 of birefringent sheet material so that a portion of the plane polarized light as represented by ray $R_n$, is directed substantially normally with respect to the test piece 7. A plane mirror surface 8 is shown contiguous with the test piece 7 so that the light ray $R_n$ is reflected back through the compensator 4, and the analyzer 5 to the viewing device 6 along a path represented by the light ray $R_n'$. Loading forces are represented by orthogonal components $F_1$ and $F_2$.

FIGURE 2 is a greatly enlarged view of a section through the test piece and containing the normal incidence rays $R_n$ and $R_n'$. The birefringent test piece 7 is contiguous with a reflecting interface 8, the surface of a metallic workpiece 9, for example. It will be understood that the loading forces acting on the test piece may be applied indirectly by a loading of the workpiece when the plastic sheet is attached thereto. The normal incidence rays $R_n$ and $R_n'$ are illustrated as directed at a small angle of incidence $\phi$ with the normal to the surface of the test piece 7. Within the test piece, however, the light rays are directed according to the index of refraction of the birefringent material so that the internal rays $r_n$ and $r_n'$ are more nearly normal to the test piece. A deviation from the normal for the normal incidence light path, somewhat exaggerated in this view, is convenient to allow for special separation of the light source and analyzer positions in the orientation of the photoelastimetric apparatus. For a birefringent material having, for example, an index of refraction of 1.6, incidence angles of about 10° and the corresponding smaller refraction angles are acceptable, produce only small corrections of the order of $\cos^2 \phi$ and are therefore included in the term "substantially normal" when describing the paths of the normal incidence light rays. Further, the thickness of conventional sheet material test pieces is so small that any dispersion of the transmitted light may be neglected.

To obtain oblique incidence fringe patterns, plane polarized light is directed along paths coplanar with corresponding normal incidence paths as represented by an oblique incidence ray $R_o$, refracted along $r_o$, reflected along $r_o'$, and emerges along $R_o'$. The oblique incidence ray direction $R_o$ is chosen to produce an angle $\theta$ with the normal within the test piece. The oblique angle $\theta$ should be sufficiently large to result in a substantial difference between the normal and oblique incidence relative retardations $d_n$ and $d_o$. Magnitudes for $\theta$ of 30°, 45°, and 60°, are convenient for substitution in Equations VI, VII, and VIII above; however, this range is exemplary and not restrictive.

As explained hereinabove, each of the light rays transmitted through the loaded birefringent test piece is resolved into two components, an E component and an O component, respectively, polarized in planes parallel with the directions of the principal stresses produced by the loading forces. Further, a relative retardation is produced between the E and O vibrations which is evidenced as a phase difference $d$ directly proportional to the difference between the magnitudes of the principal stress projections normal to the directions of propagation through the test piece. This phase difference is also directly proportional to the actual path distance through the test piece, substantially $2t$ for the normal ray and $2t/\cos \theta$ for an oblique ray.

By way of further explanation, FIG. 3 illustrates an incremental volume V of the test piece 7. The volume V should be considered as bounded by four planes. First and second boundary planes are parallel with the paper, and parallel with the normal N to the test piece and with the line of action of one of the loading forces $F_2$. The third boundary plane is parallel with the loading force $F_1$, which is directed out of the paper, and with the normal N. The fourth boundary plane is parallel with $F_1$ and with $R_o$ and at an angle $\theta$ with the third boundary plane. The direction of $R_o$ is the path of an oblique incidence ray and the direction of N is substantially that of an intersecting normal incidence ray. Taking the area subtended on the third boundary plane as A, the area $A'$ subtended on the fourth boundary plane will be $A'=A/\cos\theta$; and assuming the load on A to be P, the normal component of the equilibrant load on $A'$ will be $P'=P\cos\theta$. Therefore, the normal stress $s_2$ on A and the normal stress $s_2'$ on $A'$ are related by:

$$s_2'=P'/A'=(P/A)\cos^2\theta=s_2\cos^2\theta \qquad (IX)$$

which relationship was expressed above as Equation VII.

After normal incidence and oblique incidence data have been collected for the same region of a test piece and the corresponding values of $d_o$ and $d_n$ obtained, Equations IV and VIII may be solved simultaneously for one of the principal stresses parallel to the loading forces as follows:

$$s_1-s_2=d_n/kD_n \qquad \text{(from IV)}$$
$$s_1-s_2\cos^2\theta=d_o/kD_n\sec\theta \qquad \text{(from VIII)}$$
$$s_2=(d_n-d_o/\sec\theta)/(\cos^2\theta-1)kD_n \qquad (X)$$

The other principal stress parallel to the loading forces, $s_1$, may be calculated by substitution.

Instead of necessitating reorientation or the substitution of the second system for the production of oblique incidence fringe patterns, the photoelastimetric apparatus of this invention is characterized, with further reference to FIGURE 1, in that light directing devices such as mirrors 10 and 11 and indexing devices such as pointer 12 are provided in a prescribed orientation with respect to the conventional optical components to present multiple incidence fringe patterns simultaneously. By way of example, mirrors 10 and 11 are attached to the mount 1 and oriented with respect thereto so that a portion of the incident plane polarized light is directed along the path of ray $R_o$ to the region of the test piece material under study, through the test piece material along a desired path, reflected at interface 8 and again refracted along $R_o'$ to mirror 11. Mirror 11 is oriented to direct the oblique incidence light through analyzer 5, and to the viewing device 6.

Pointer 12 is provided as an aid for the special orientation of the apparatus and is rotatably affixed to the mount 1 by hinge 14 so as to be readily removed from the field of view when not in use. Preferably the mirrors 10 and 11 are arranged symmetrically about the longitudinal axis of the pointer 12 so that when pointer 12, at its indexing position, is normal to and in contact with the test piece, the predetermined angles of incidence are automatically obtained. The angular position of the mirrors 10 and 11 is fixed relative to the mount 1 and to the other components of the apparatus to provide the chosen direction of propagation of oblique incidence light through the given test piece material.

The viewing device 6, shown attached to mount 1 by a flexible support 13, may be directed to investigate either of the fringe patterns without any operational adjustment of the apparatus. It should be noted, however, that the viewing device 6 is an accessory and may be dispensed with, the fringe patterns being viewed directly by an observer; alternatively photographic or electronic light responsive apparatus may be substituted.

In polychromatic fringe patterns, certain color differentials more readily defined than others, are referred to as "tints of passage." These fringes are the color change that occurs in the region at the end of one spectrum color series, or order, and at the start of the next. The tints of passage are observed as a narrow band between the violets of a preceding order and the reds of the next succeeding order. With reference to Equation III above and assuming a crossed analyzer position so that $A=0$, the first tint of passage is produced at positions in a fringe pattern where the relative retardation between the E and O rays is equal to a known phase difference, $d_1=L_1$; at the positions of the second tint of passage the phase difference is $d_2=2L_1$, etc. Since the color observed in a fringe pattern is a known complementary function of the color extinguished by interference, the wave length $L_1$ can be assigned a definite dimension.

Because of the precise data obtainable at tint of passage positions, it has been conventional to employ a compensator such as shown at 4 in FIGURE 1 to add a known phase difference to that produced within the test piece when otherwise no tint of passage would coincide with the region under study. By adjusting the compensator value fringe patterns are effectively translated with respect to the pertinent region until the required position of a tint of passage is obtained.

Although other types of compensators may be employed, the compensator 4 is illustrated as of the Babinet type and comprises complementary wedges 15 and 16 of a birefringent material such as quartz. One wedge is cut with its optic axis perpendicular to its refracting edge and the other is cut with its optic axis parallel with its refracting edge. The phase difference added by compensator 4 to transmitted light is, therefore, a linear function of the displacement of the transmitted light perpendicular to the refracting edges of the component wedges 15 and 16.

A scale 17 may be provided for the compensator and graduated according to the compensator-produced phase difference, or compensation, $d_c$. With rectilinear wedges, the compensation varies linearly from 0 where the wedge thicknesses are equal, to positive and negative maxima at positions near the base of one or the other of wedges 15 and 16. Therefore, with the compensator adjusted to cause, for example, the first tint of passage, in crossed-analyzer, normal-incidence fringe patterns to coincide with a given test piece region, the phase difference attributable to the effect of the test piece, $d_n$, is given by:

$$d_n=L_1-pL_1/f=fL_1/f-pL_1/f \qquad (XI)$$

where $f$ is the number of scale divisions equivalent to a change in compensator value of $L_1$, the predetermined wave length associated with the first tint of passage fringe, and $p$ is the number of compensator scale divisions between the scale 0 and the scale position of the first tint of passage fringe when that fringe is shifted to be superimposed upon the pertinent test region in a normal incidence observation. In general, it will require a different amount of compensation to shift the same fringe in the oblique incidence view into superposition upon the same test piece region. However, the determination of $d_o$ follows similarly according to:

$$d_o=fL_1/f-qL_1/f \qquad (XII)$$

where $q$ is the number of scale divisions between the scale 0 and the position of the first tint of passage fringe when the fringe is shifted to be superimposed upon the pertinent test piece region in an oblique incidence observation.

The values of $d_n$ and $d_o$ may be inserted in Equation X, above, for calculation of principal stress magnitudes.

FIGURE 4 is a representation of an alternative embodiment of this invention useful where areas on both sides of the test piece 7 are available for orientation of the apparatus components. As illustrated, the lamp 2, and polarizer 3 are positioned at one side of the test piece 7 and the compensator 4, analyzer 5, and viewing device 6 are positioned at the other side. A first portion of the plane polarized light, represented by $R_o$, is incident upon the test piece along a path direction chosen to yield the desired oblique angle $\theta$ for the light path $r_o$ through the material of the test piece. The apparatus, is characterized by the inclusion of mirrors 10 and 11 oriented to direct a second portion of the incident plane polarized light through the test piece along the normal thereto and through the compensator 4 and analyzer 5 to the viewing position represented by viewing device 6. With proper attention to the physical path distance D, the various relationships set forth in this application may be applied generally to the apparatus of FIG. 4 as well as to that of FIG. 1.

A unique advantage provided by this invention is that upon the provision of additional compensator indicia, values of a principal stress in the test piece, $s_2$ for example, may be read directly according to the relative compensations required to superimpose a given fringe in both normal and oblique incidence fringe patterns upon a pertinent test piece region. For this latter purpose a transparent plate 18, shown in FIG. 1 and in more detail in FIG. 5, is arranged contiguous with the compensator 4 and provided with a read-out scale 19. The plate 18, and hence the zero of scale 19, is translatable parallel with the scale 17.

Assuming normal and oblique observations are made through the compensator 4 and that the compensator scale values $p$ and $q$ are determined after the effective superposition in both fringe patterns of the first tint of passage upon a given test piece region, the relationships XI and XII may be substituted in Equation X to give:

$$s_2 = [(fL_1/f - pL_1/f) - (fL_1/f - qL_1/f)/\sec\theta]/(\cos^2\theta - 1)kD_n \quad (XIII)$$

Since the oblique angle of incidence is fixed by the orientation of the photoelastimetric apparatus according to this invention, a definite oblique incidence angle may be assigned, $\theta = 60°$ for example, and Equation XII may be simplified as:

$$s_2 = (f + q - 2P)L_1/ -1.50 fkD_n \quad (XIV)$$

Thereupon, the read-out scale 19 is marked in scale divisions equal in length to the scale divisions on compensator scale 17 and a read-out scale factor $g$ is assigned according to:

$$g = L_1/ -1.50 fkD_n \quad (XV)$$

so that the value of an unknown stress, $s_2$ may be read directly as:

$$s_2 = (f + q - 2p)g = rg \quad (XVI)$$

where $r$ is a number of read-out scale divisions determined as follows.

The determination of $r$ is made by an inspection of the oblique and normal incidence fringe positions as illustrated in FIGURE 5. The appearance of the first tint of passage fringe in the normal incidence observations as seen through the compensator 4 of FIGURE 5, appears at a compensator scale position $p$, when the compensator or viewing position has been adjusted to superimpose that fringe upon the pertinent test piece region, here indicated by the cross X. If the simultaneous value of $q$ were to be found equal to $2p$, then $r$, according to Equation XV, would be equal to $f$. Therefore, as shown, the transparent plate 18 is translated so that a read-out scale position equivalent to $f$ coincides with a compensator scale position equivalent to $2p$. Without further adjustment of the plate 18, the compensator or viewing position is altered, so that as represented in FIG. 5b, the first tint of passage fringe in the oblique incidence observation appears superimposed upon the pertinent test piece region at X. By vector addition on the read-out scale:

$$r = (f - p) + (q - p) = f + q - 2p \quad (XVII)$$

Therefore, $r$ is determined by the number of read-out scale divisions between the read-out scale zero and the intersection, opposite $p$ on the compensator scale, of the normal incidence fringe with the read-out scale 19. For convenience, markings in stress units may be placed directly on the read-out scale 19 so that the value of $s_2$ is given directly as $rg$.

Since the principal stresses, $s_1$ and $s_2$, are at right angles to each other in the test piece, a second determination according to the above may be made after a 90° rotation of the apparatus of this invention about the normal to the pertinent test piece region. The nominal principal stresses $s_1$ and $s_2$ will then be interchanged in the several relationships expressed above and the value of the remaining unknown principal stress may be found directly. It will be noted by inspection that the relationship of Equation VIII is general and that a similar equation for the case where oblique incidence light is directed through the pertinent test piece region in a direction substantially normal with the direction of the second principal stress $s_2$ and at a substantial oblique angle $\theta'$ with the direction of the first principal stress $s_1$, may be written as follows:

$$s_2 - s_1 \cos^2\theta' = d_o'/kD_n \sec\theta' \quad (XVIII)$$

where $d'$ is the phase difference, relative retardation, between the O and E rays of the transmitted light as before. Simultaneous solution of Equations VIII and XVIII will yield expressions for the principal stress magnitudes. When $\theta = \theta' = 60°$ they are:

$$s_2 = 4(d_o + 2d_o')/15kD_n \quad (XIX)$$

$$s_1 = 4(2d_o + d_o')/15kD_n \quad (XX)$$

Any such expression for a principal stress magnitude may be evaluated algebraically or, directly, by means of a compensator adapted and manipulated in a manner analogous to the embodiment explained in connection with FIG. 5.

It will be apparent that various read-out scale plates interchangeable with plate 18 may be provided, each with a readout scale similar to read-out scale 19 but having a scale factor and a scale reading according to specific values of the constant factors of Equation XIII. In addition, the scale factor $g$ may be chosen so that readings on scale 19 are in any convenient system of units, in terms of strains rather than stresses, and in terms of the loading forces applied to the test piece or to a workpiece to which the test piece is attached.

While the application of a specific compensator has been illustrated, the apparatus and method of this system may be adapted for use with other compensator types and equivalents. It should also be apparent that, after the production of isoclinic fringes for the determination of principal stress directions, elliptically polarized light may be utilized during the production and investigation of the isochromatic fringes.

Various substitutions and modifications of the apparatus and method of this invention will be apparent to those skilled in the art of photoelastimetric analysis and it should be noted, therefore, this invention is not to be restricted by the illustration and explanation of specific embodiments.

What is claimed is:

1. Photoelastimetric apparatus for the investigation of principal plane stresses acting laterally within a region of a sheet of transparent birefringent material contiguous with a reflecting surface, said apparatus comprising:

a mount relatively rotatable about an axis through said region and, supported on said mount, a unitary light source, a sheet material polarizer, a sheet material analyzer, an axially elongated pointer, and first and second plane mirrors;

said polarizer and said analyzer being coplanar and symmetrically displaced to opposite sides of said axis at one end thereof;

said pointer being located at the other end of said axis and oriented coaxially with respect thereto;

said first and second mirrors being located intermediate said ends of said axis, symmetrically displaced to opposite sides thereof, and equiangularly disposed with respect thereto;

said source being located behind said polarizer and illuminating said first mirror and said pointer;

and said source, polarizer, first and second mirrors, and analyzer being further relatively oriented with respect to said axis and to said pointer to simultaneously define first and second coplanar light paths through the region when said apparatus is in a position with said pointer contiguous with the region and said axis perpendicular to the plane of the principal stresses;

said first light path extending from said source, through said polarizer, through the region, to the reflecting surface, back through the region, and through said analyzer, when said apparatus is in said position;

said second light path extending from said source, through said polarizer, to said first mirror, through the region, to the reflecting surface, back through the region, to said second mirror, and through said analyzer, when said apparatus is in said position;

the portion of said first light path within the region being substantially normal to the plane of the principal stresses when said apparatus is in said position; and the portion of said second light path within the region being at a substantial oblique angle with the normal to the principal stresses acting within the region when said apparatus is in said position;

whereby upon relative rotation of said apparatus in said position about said axis, the plane of said coplanar light paths may be oriented parallel with one and the other of the principal stresses acting laterally of the region to yield photoelastic fringe information for the immediate resolutions of the individual magnitudes of the principal stresses.

References Cited in the file of this patent

UNITED STATES PATENTS

| | | |
|---|---|---|
| 2,457,799 | Altenberg | Jan. 4, 1949 |
| 3,012,468 | Magill et al. | Dec. 12, 1961 |

FOREIGN PATENTS

| | | |
|---|---|---|
| 1,138,768 | France | Feb. 4, 1957 |
| 1,161,842 | France | Mar. 31, 1958 |

OTHER REFERENCES

Rousseau (France) 71,278, 1st Addition of 1,148,457, April 27, 1959 (3 pp. spec.; 1 sht. dwg.).

Societe (France) 1,116,824, Addition No. 70,037, Oct. 13, 1958 (3 pp. spec.; 2 shts. dwg.).